John J. Mullane INVENTOR.
BY P. J. Whelan.
ATTORNEY

Patented Jan. 30, 1945

2,368,486

UNITED STATES PATENT OFFICE 2,368,486

WELL LOGGING

John J. Mullane, Tulsa, Okla., assignor to Standard Oil Development Company, a corporation of Delaware Application February 2, 1942, Serial No. 429,181

4 Claims. (Cl. 250—83.6)

The present invention is directed to a method of logging wells drilled for oil and particularly to that type of logging in which the mud return from the wells is examined for oil shows.

Methods for logging wells have already been proposed in which measurement of the radioactivity of the formation traversed by the bore hole is made. The method commonly employed is one in which a Geiger-Müller counter is lowered into the hole. This method has a particular limitation due to the casing of the bomb. Because the bomb, lowered into the bore hole containing the counter is subjected to high pressures, it must have a high mechanical strength. The result is that the casing of the bomb cannot be penetrated by any radioactive particles or rays, except gamma rays. Crude oil, however, does not seem to give off gamma rays, but gives off alpha particles which have a far lower penetration power. No method has been devised heretofore for directly measuring the alpha rays given out by the formation traversed by the bore hole.

The principal object of the present invention is the provision of a method suitable for the production of a log of the alpha radiation of the formations traversed by the bore hole and the fluid contained in these formations.

An additional object of the present invention is to provide a method and apparatus for the production at the surface of the hole during the drilling thereof, a log of the total radioactivity of the formation traversed by the bore hole and the fluid contents thereof.

Figure 1:
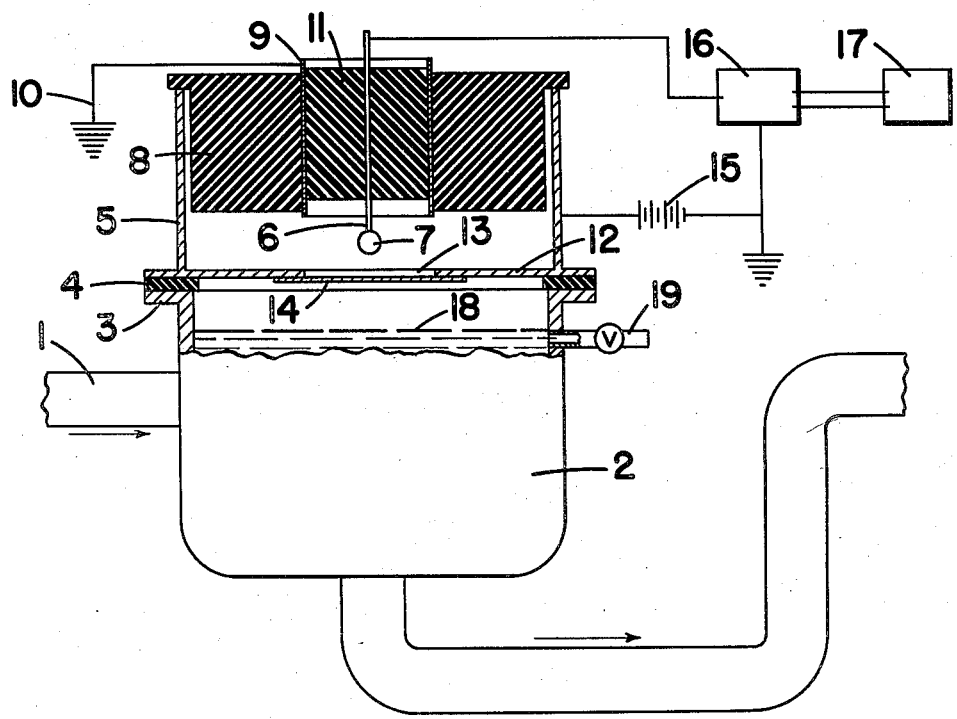
Figure 2:
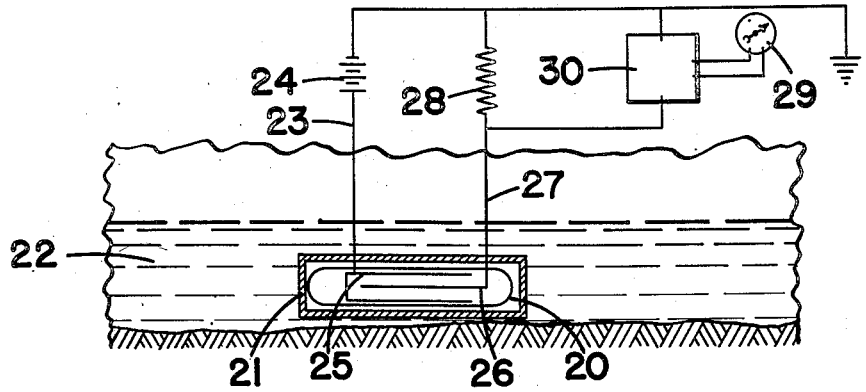

Further objects and advantages of the present invention will appear from the following detailed description of the accompanying drawing in which Fig. 1 is a front elevation, partly in section, of one form of apparatus which may be used in the practice of the present invention; and Fig. 2 is a diagrammatic form of an alternate embodiment of the present invention.

Referring to Fig. 1 in detail, numeral 1 designates the mud return line which connects the surface casing of the oil well with the mud settling pit. This line empties into a pot 2 which is of sufficient diameter to hold part of the fluid and has a substantially quiescent surface. The pot 2 has an outlet in the bottom to which a continuation of the mud return line is connected.

Pot 2 has a flange 3 at its upper end on which is laid a rubber or Bakelite gasket 4 upon which, in turn, rests a proportional Geiger counter of the type described on page 260 et seq. of Procedures in Experimental Physics by John Strong, published in 1939 by Prentice-Hall.

Briefly, the counter consists of an outer electrode 5 and an inner electrode 6, the latter being a rod having at its lower end a ball 7. The outer electrode is in the form of a cylinder having an open end fitted with a plug 8 of insulating material of Bakelite or rubber. The plug has a central opening in which is fitted a metal cylinder 9 which is grounded at 10 to serve the purpose of a guard ring. The cylinder 9, in turn, carries an insulating block 11 which, in turn, carries the central electrode 6.

The other electrode, cylinder 5, has a wall 12 in the lower end thereof which has an opening 13 covered by a thin lacquer film 14. The covering is made thin because of the low penetrating power of alpha particles.

Between the electrode 5 and electrode 6 is connected a battery 15 of suitable voltage to operate the counter. The central electrode 6 is connected with a linear amplifier 16, the output of which is fed to a recorder 17 which may take the form of a recording galvanometer. When a recording galvanometer is used, the recording strip may be operated by a time mechanism so that the measurements recorded will plot against time. The measurements can then be correlated with drilling records as to depth. Rate of penetration instruments have been developed and one of these may be coupled directly to the recording galvanometer so that the measurements will be recorded and correlated directly with depth.

As the mud return from the well discharges into the pot 2, any oil contained therein will rise to the surface, indicated by numeral 18. Since oil will be found in only one or a few widely separated formations, there is no likelihood of confusion as to the depth from which the oil came. Should oil appear at the surface 18 and be recorded by virtue of the alpha particles which emanate, the surface layer can be drawn out at tap 19 so that a fresh surface can be exposed. If desired, the tap can be held open continuously so as to present a fresh surface at all times.

It will be apparent that the cuttings from the formations traversed will be contained in the returns of the drilling fluid and that, if any of the solid or fluid contents of such cuttings exhibit alpha radioactivity, the correlation of said radioactivity with depth will be revealed on the log. Thus, horizons which contain solid or fluid materials which exhibit alpha radioactivity produce humps or anomalous portions on the log which may then be used for correlation purposes for all wells in the area being drilled.

The Geiger counter shown is one which responds selectively to alpha particles. If desired, it may be replaced by any conventional counter while using the same thin window 14 so that the alpha and beta and gamma rays can reach the electrodes. In this case, the total radioactivity of the formation traversed will be revealed on the log produced.

When it is not desired to produce a log of the alpha radioactivity alone, the embodiment shown in Fig. 2 may be utilized. In this case, a Geiger-Müller counter 20 of conventional design is arranged in a metal case 21 and laid or suspended in the mud return line or ditch 22. One lead 23 from the counter is connected to the battery 24 which creates the potential difference between electrodes 25 and 26. The other lead 27 connects the electrode 26 to the resistance 28, the drop across which is measured by a reading device 29 after being amplified by a suitable amplifier 30.

It will be apparent that the invention described above contemplates in practice embodiments different from those illustrated. For example, while the radioactive responsive device is shown arranged in the mud return line, it will be apparent that there can be a similar device arranged in the inlet line to the drill stem and a separate log of the drilling fluid in the inlet line produced for comparison with that produced in the mud return line.

The embodiments illustrated and described are presented merely for illustrative purposes and not for the purpose of defining the scope of the invention.

What is claimed is:

1. A method for logging a bore hole drilled for oil by the method in which a continuous circulation of drilling fluid is maintained between the surface and the bit which comprises arranging in said stream of drilling fluid a device sensitive to radioactive emanations and continuously recording the responses of said device to the materials in the said drilling fluid during the drilling operation.

2. A method for logging a bore hole drilled for oil by the method in which a continuous circulation of drilling fluid is maintained between the surface and the bit which comprises arranging in said stream of fluid a device sensitive primarily to alpha rays and observing the responses of said device to the materials in said drilling fluid during the drilling operation.

3. A method for logging a bore hole drilled for oil by the method in which a continuous circulation of drilling fluid is maintained between the surface and the bit which comprises arranging in said stream of fluid a device sensitive primarily to alpha rays and continuously recording the responses of said device to the materials in said drilling fluid during the drilling operation.

4. An apparatus for logging a well drilled for oil by the method in which a continuous circulation of drilling fluid is maintained between the surface and the bit comprising a conduit for said drilling fluid at the surface, an enlarged chamber in said conduit adapted to hold a body of said fluid with a substantially quiescent surface, and a detector for radioactive emanations arranged adjacent the top of said chamber.

JOHN J. MULLANE.